US012645970B2

(12) United States Patent
Mizrahi

(10) Patent No.: US 12,645,970 B2
(45) Date of Patent: Jun. 2, 2026

(54) TWO-STAGE ABLATION LOADING FOR QUANTUM INFORMATION PROCESSING (QIP) SYSTEMS

(71) Applicant: IonQ, Inc., College Park, MD (US)

(72) Inventor: Jonathan Albert Mizrahi, Silver Spring, MD (US)

(73) Assignee: IonQ, Inc., College Park, MD (US)

( * ) Notice: Subject to any disclaimer, the term of this patent is extended or adjusted under 35 U.S.C. 154(b) by 387 days.

(21) Appl. No.: 18/523,307

(22) Filed: Nov. 29, 2023

(65) Prior Publication Data

US 2024/0211790 A1 Jun. 27, 2024

Related U.S. Application Data

(60) Provisional application No. 63/476,573, filed on Dec. 21, 2022.

(51) Int. Cl.
*G06N 10/40* (2022.01)
*G21K 1/20* (2026.01)

(52) U.S. Cl.
CPC ............... *G06N 10/40* (2022.01); *G21K 1/20* (2026.01)

(58) Field of Classification Search
CPC ......... G06N 10/00; G06N 10/40; H01J 49/16; H01J 49/164
See application file for complete search history.

(56) References Cited

U.S. PATENT DOCUMENTS

2021/0183632 A1* 6/2021 Williams ............ H01J 49/0463
2021/0335591 A1* 10/2021 Kim ........................ H01J 49/24

* cited by examiner

*Primary Examiner* — David E Smith
(74) *Attorney, Agent, or Firm* — ARENTFOX SCHIFF LLP

(57) ABSTRACT

Aspects of the present disclosure relate to efficiently trapping ions for QIP systems. A system may include an ablation laser beam source and an ion trapping structure including: an enclosure with an orifice, a source material that is arranged in the enclosure and receives an ablation laser pulse to provide a plume of atoms. A system may include at least one LED that is arranged in the enclosure and onto which at least a portion of the plume of atoms is deposited, wherein the at least one LED is configured to emit light that desorbs at least one deposited atom through the orifice. A system may include an ion trap with a gap through which the at least one deposited atom desorbed travels from the orifice, and a laser beam source configured to generate a laser beam towards the at least one deposited atom creating a trapped ion.

20 Claims, 7 Drawing Sheets

400

400

500

600

650

700

800

900

TWO-STAGE ABLATION LOADING FOR QUANTUM INFORMATION PROCESSING (QIP) SYSTEMS

CROSS-REFERENCE TO RELATED APPLICATIONS

This application claims the benefit of U.S. Provisional Application No. 63/476,573, filed Dec. 21, 2022, which is herein incorporated by reference.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

To operate a trapped ion quantum computer, ions must first be loaded into an ion trap. This loading process involves creating a plume of neutral atoms that intersects the ion trap volume, and using lasers to ionize atoms from within that plume to create ions. The plume may be created using thermal loading or ablation loading. However, in order for the ions created by any of these processes to actually be trapped and hit with a laser, their velocity must be sufficiently slow. Any atom moving too fast is untrappable. For example, ablation loading has an unfortunate property that the vast majority of atoms released are moving far too fast to be trapped and only a small minority of atoms are moving slow enough. This makes the process highly inefficient as the vast majority of atoms are wasted. This wasteful characteristic is even more detrimental when only a small amount of a source material with the requisite atom is available and/or the source material is rare/expensive.

It is therefore important to improve the efficiency of trapping ions.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of systems and methods for use in the implementation and/or operation of quantum information processing (QIP) systems, and more particularly, to implementation of two-stage ablation loading for QIP systems.

In some aspects, the techniques described herein relate to a quantum information processing (QIP) system including: an ablation laser beam source configured to generate an ablation laser pulse; an ion trapping structure including: an enclosure with an orifice, a source material that is arranged in the enclosure and receives the ablation laser pulse to provide a plume of atoms; at least one LED that is arranged in the enclosure and onto which at least a portion of the plume of atoms is deposited, wherein the at least one LED is configured to emit light that desorbs at least one deposited atom through the orifice of the enclosure; and an ion trap with a gap through which the at least one deposited atom desorbed travels from the orifice; and a laser beam source configured to generate a laser beam towards the at least one deposited atom creating a trapped ion.

In some aspects, the techniques described herein relate to a QIP system, wherein the at least one LED is arranged opposite to the orifice.

In some aspects, the techniques described herein relate to a QIP system, wherein a size of the orifice is at most a size of the gap in the ion trap.

In some aspects, the techniques described herein relate to a QIP system, wherein the at least one deposited atom is desorbed with a thermal velocity distribution that is a function of a surface temperature of the at least one LED.

In some aspects, the techniques described herein relate to a QIP system, wherein the at least one LED lines all sides within the enclosure with an exception of an area where the source material is arranged.

In some aspects, the techniques described herein relate to a QIP system, wherein the at least one LED includes multiple LEDs and each LED is independently controllable to enable sectional desorption.

In some aspects, the techniques described herein relate to a QIP system, further including a transparent substrate arranged on top of the at least one LED such that the portion of the plume of atoms is deposited on the transparent substrate in place of the at least one LED.

In some aspects, the techniques described herein relate to a QIP system, further including an opaque substrate that directly receives the portion of the plume of atoms, wherein the at least one LED is arranged opposite to the opaque substrate.

In some aspects, the techniques described herein relate to a QIP system, wherein the at least one LED is arranged on a side with the orifice of the enclosure.

In some aspects, the techniques described herein relate to a quantum information processing (QIP) system including: an ablation laser beam source configured to generate an ablation laser pulse; an external light source configured to generate a first laser beam; an ion trapping structure including: an enclosure with an orifice, a source material that is arranged in the enclosure and receives the ablation laser pulse to provide a plume of atoms; an opaque substrate that is arranged in the enclosure and receives both the first laser beam and at least a portion of the plume of atoms, causing desorption of at least one atom through the orifice of the enclosure; and an ion trap with a gap through which the at least one atom travels from the orifice; and a laser beam source configured to generate a second laser beam towards the at least one atom creating a trapped ion.

In some aspects, the techniques described herein relate to a quantum information processing (QIP) system including: an ablation laser beam source configured to generate an ablation laser pulse; an ion trapping structure including: an enclosure with an orifice, a source material that is arranged in the enclosure and receives the ablation laser pulse causing a creation of a plume of atoms; a hot plate that is arranged in the enclosure onto which at least a portion of the plume of atoms is deposited, wherein the hot plate increases in temperature causing thermal desorption of at least one atom through the orifice; and an ion trap with a gap through which the at least one atom travels from the orifice; and a laser beam source configured to generate a laser beam towards the at least one atom creating a trapped ion.

In some aspects, the techniques described herein relate to a quantum information processing (QIP) system including: an ablation laser beam source configured to generate an ablation laser pulse; an ion trapping structure including: an enclosure with an orifice, a source material that is arranged in the enclosure and receives the ablation laser pulse to provide a plume of atoms; a hot plate that is arranged in the enclosure and receives at least a portion of the plume of atoms, wherein the hot plate increases in temperature causing thermal desorption of at least one atom; at least one LED that is arranged in the enclosure and onto which the at least one atom is deposited, wherein the at least one LED is configured to emit light that desorbs the at least one atom through the orifice of the enclosure; and an ion trap with a gap through which the at least one atom travels from the orifice; and a laser beam source configured to generate a laser beam towards the at least one atom creating a trapped ion.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
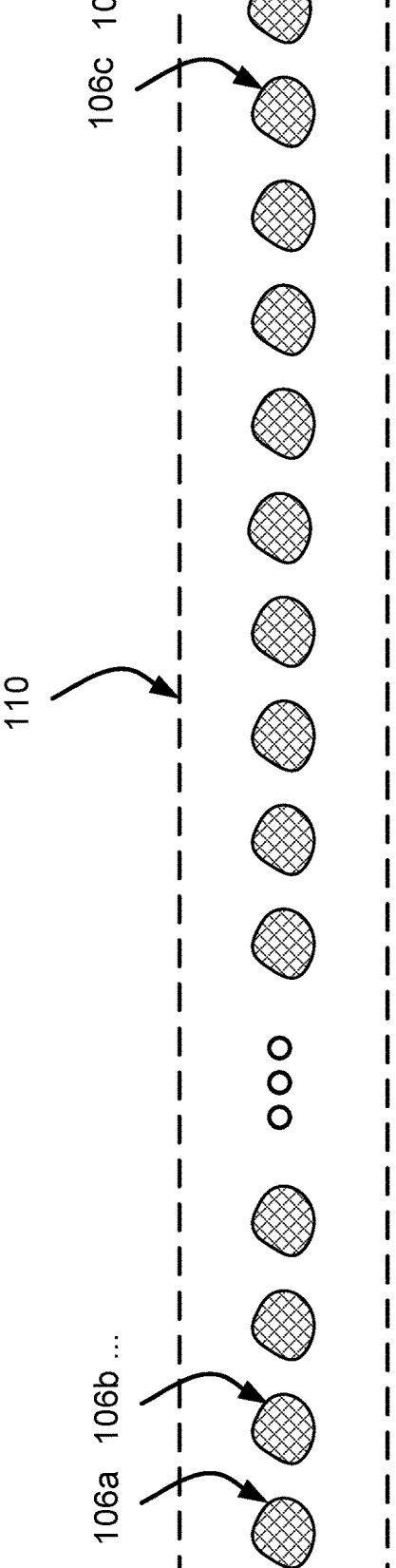
FIG. 1 illustrates a view of atomic ions a linear crystal or chain in accordance with aspects of this disclosure.

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well-known components.

In the field of quantum information processing (QIP) systems, it is common to use laser beams to illuminate trapped ions. As discussed previously, trapping ions involves creating a plume of neutral atoms that intersects with an ion trap volume. There are two common methods used to create a plume of neutral atoms. The first method is thermal loading, in which a source material with the requisite atom is heated to thermally emit atoms. Because thermal emission does not typically dissociate molecular bonds, thermal loading only works for elemental forms of the atom—not compounds. For example, barium atoms are typically used in molecular form and require dissociation. Thus, the first method would not be useful. The second method is ablation loading, in which a powerful laser pulse is used to ablate a plume of atoms from the source material. This method works with either elemental forms or compounds as ablation can disassociate molecules. A less common method for creating a plume of atoms is light induced atomic desorption (LIAD). This also only works for elemental forms. Not all of the atoms in the plume created by these methods are able to be trapped. Each of these methods has an associated velocity distribution for the released atoms, and only atoms travelling sufficiently slowly can be trapped. Ablation is the only method described above which is reliably able to dissociate molecular compounds, but it is highly inefficient for trapping ions, because it tends to produce fast moving atoms that move too quickly to be trapped. This ultimately leads to waste of the source material.

As such, provided herein in one or more implementations are QIP systems for trapping ions that include a laser beam source and a structure arranged to improve the efficiency of trapping ions. In particular, two-stage ablation loading is discussed in which ablation is used to create a plume of atoms in the first stage, and LIAD and/or thermal desorption is used for subsequent trapping in the second stage.

Solutions to the issues described above are explained in more detail in connection with FIGS. 1-9, with FIGS. 1-3 providing a background of QIP systems or quantum computers, and more specifically, of atomic-based QIP systems or quantum computers.

Figure 2:
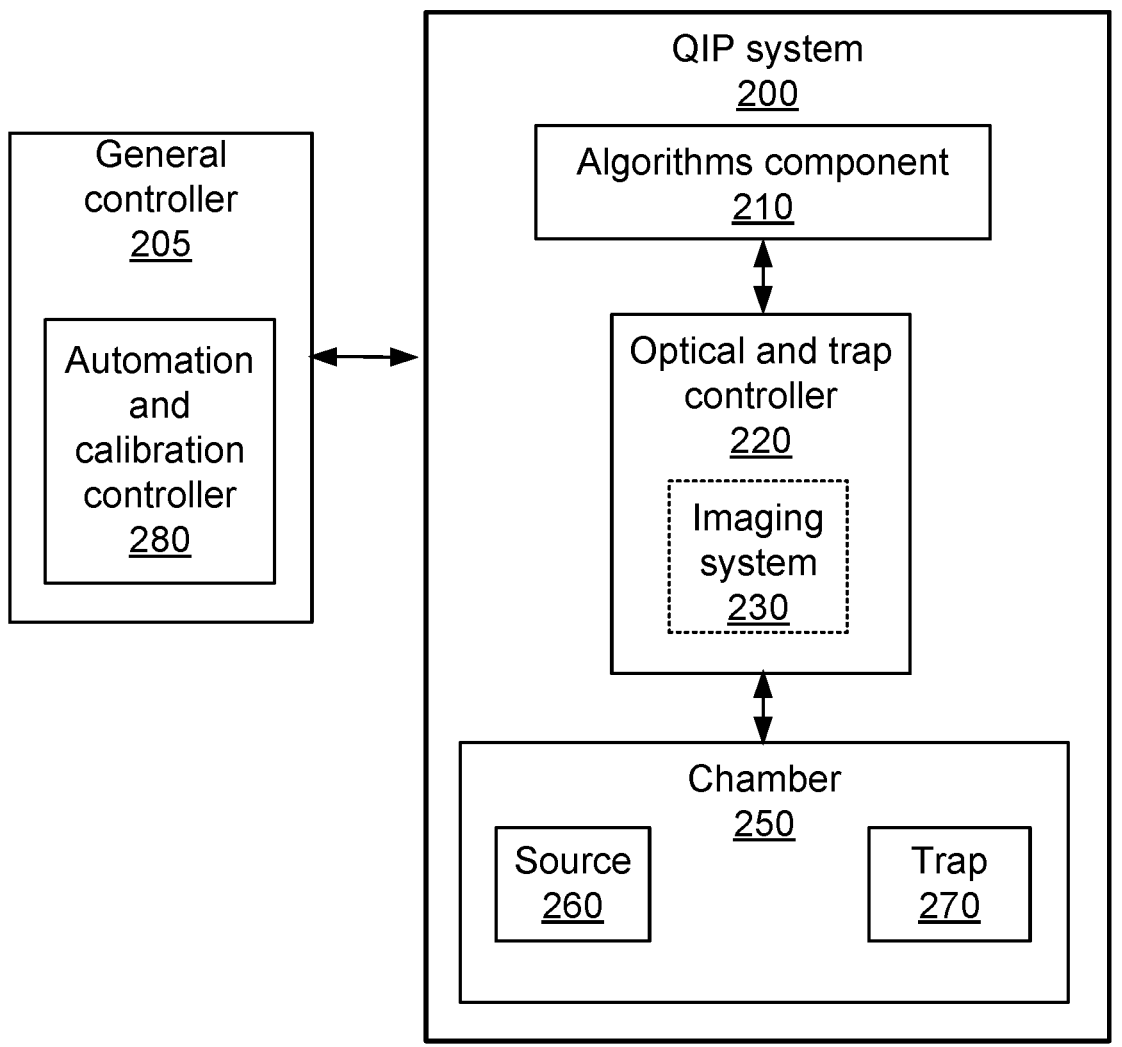
FIG. 2 illustrates an example of a quantum information processing (QIP) system in accordance with aspects of this disclosure.

FIG. 1 illustrates a diagram 100 with multiple atomic ions or ions 106 (e.g., ions 106a, 106b, . . . , 106c, and 106d) trapped in a linear crystal or chain 110 using a trap (not shown; the trap can be inside a vacuum chamber as shown in FIG. 2). The trap may be referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be Ytterbium ions (e.g., $^{171}$Yb$^+$ ions), for example. The ions are illuminated with laser (optical) radiation tuned to a resonance in $^{171}$Yb$^+$ and the fluorescence of the ions is imaged onto a camera or some other type of detection device (e.g., a photomultiplier tube (PMT)). In this example, ions may be separated by a few microns (µm) from each other, although the separation may vary based on architectural configuration. The separation of the ions is determined by a balance between the external confinement force and Coulomb repulsion and does not need to be uniform. Moreover, in addition to Ytterbium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for case of understanding. Such components may include one or more sub-components, the details of which may be provided below as needed to better understand certain aspects of this disclosure.

Aspects of this disclosure may be implemented at least partially using the QIP system 200 with the optical elements of a beam shaping structure as arranged therein.

Figure 3:
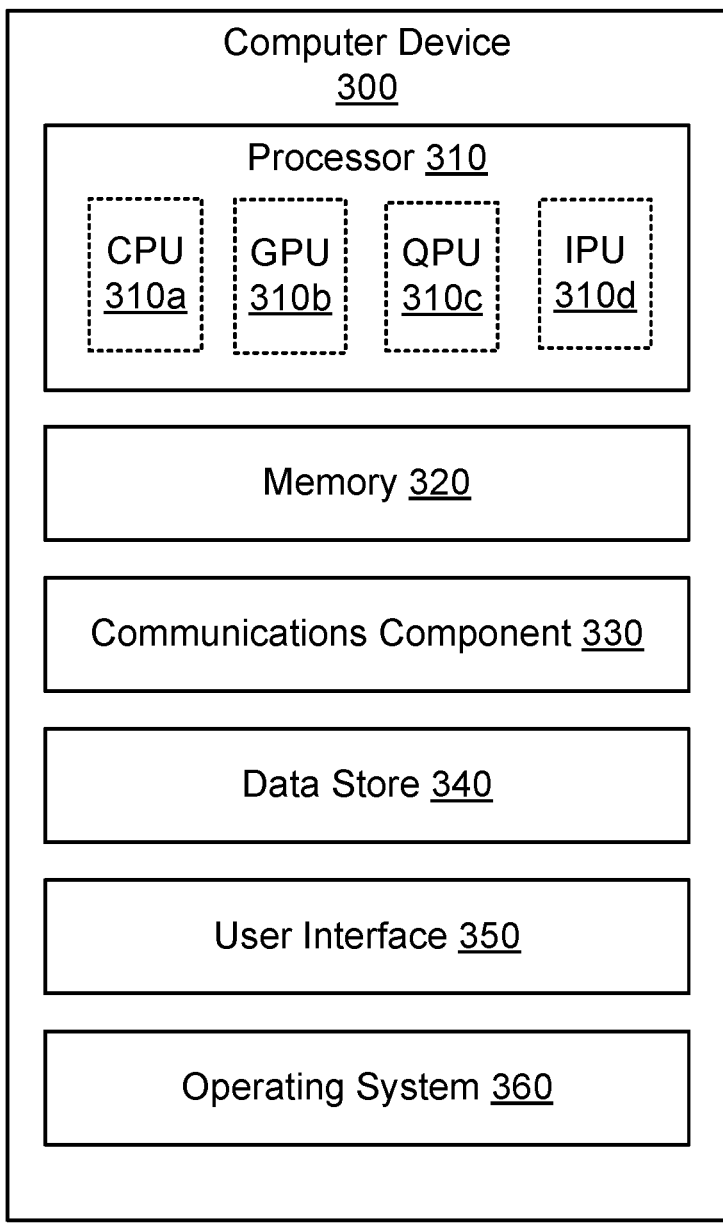
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310c. Some or all of the QPUs 310c may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, in one or more implementations, the QIP systems as disclosed herein include structures inserted into the QIP system that improve the efficiency of trapping ions relative to conventional trapping structures.

Figure 4:
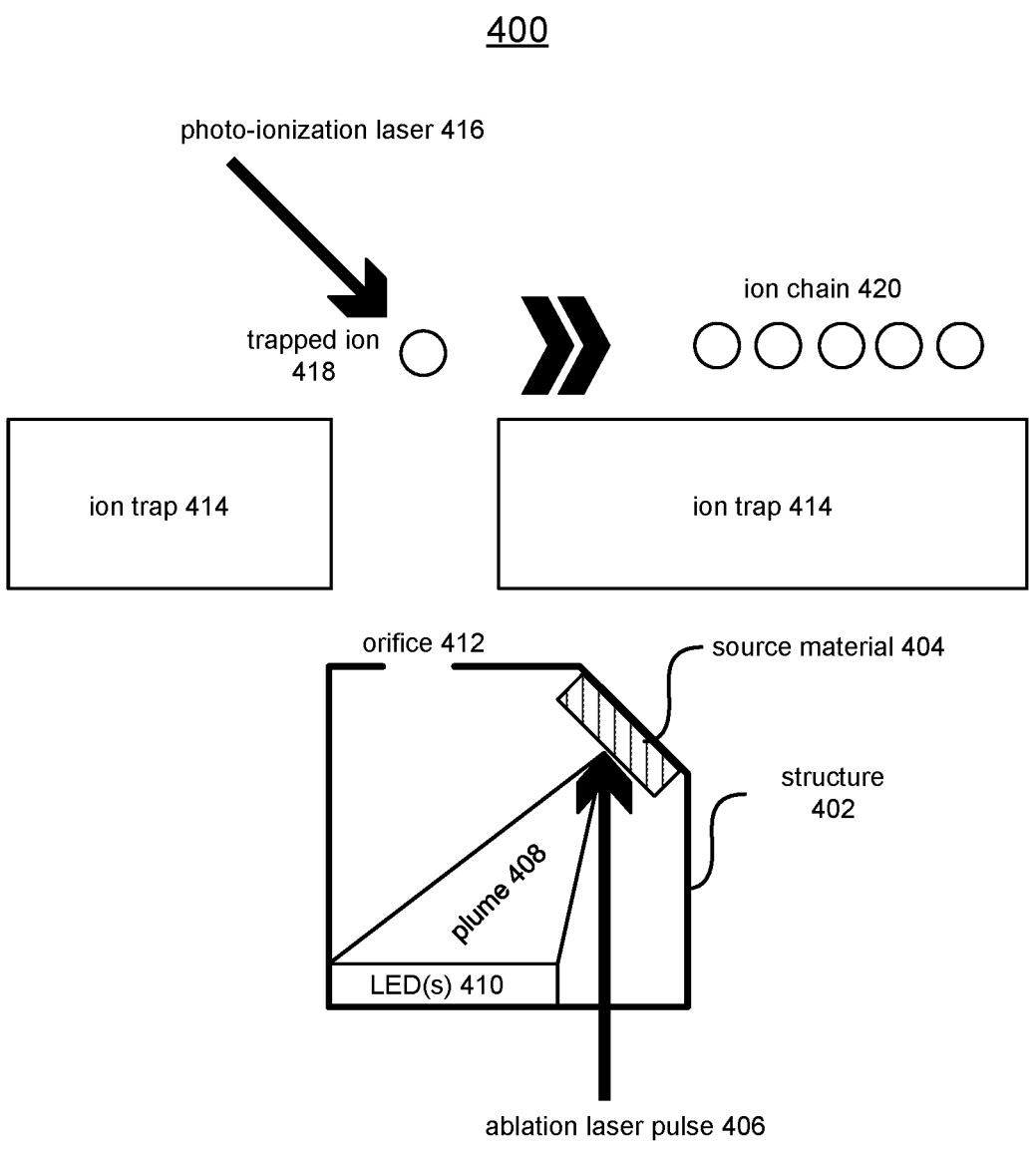
FIG. 4 illustrates an exemplary system for trapping ions in accordance with aspects of this disclosure.

FIG. 4 illustrates an exemplary system 400 for trapping ions in accordance with aspects of this disclosure. System 400 may be part of chamber 250 where source 260 is source material 404 and trap 270 includes ion trap 414 and structure 402 and its contents. More specifically, structure 402 is an enclosure with an orifice 412 configured to allow for atoms to exit into ion trap 414. In some aspects, structure 402 may be a titanium enclosure.

In operation, ablation laser pulse 406 may be directed towards source material 404 (e.g., a barium substrate) such that plume 408 is created. The plume 408 is a collection of the source material that is configured, based on the laser pulse 406, to cover one or more LEDs 410. The LEDs are in turn configured to emit blue or ultraviolet light that is suitable for LIAD emission according to an exemplary aspect. Effectively, this configuration deposits free atoms from source material 404 on the surface of LED(s) 410, where the free atoms are deposited. In general, even though FIG. 4 depicts a simplistic representation of plume 408 covering LED(s) 410, plume 408 can be a collection of free atoms that can fill the volume of structure 402. Plume 408 may deposit atoms across the entire interior surface of structure 402, but is not distributed throughout the volume except during the few microseconds while the plume exists. Nevertheless, the greatest concentration of plume 408 will be directed to LED(s) 410 because LED(s) 410 are situated in an area intersecting with the vector perpendicular to the surface of the source material 404 at the location which is hit by the ablation laser pulse 406. It is also noted that structure 402 can generally have a three-dimensional rectangular shape (with a diagonal corner where source material 404 is located(, but can have other cross-sectional shapes in alternative embodiments.

In any event, according to the configured operation, after an ablation pulse has fired and deposited material on the LED(s) 410, the LED(s) 410 are turned on for a given amount of time, which causes the previously absorbed atoms to desorb with a thermal velocity distribution determined by the surface temperature of LED(s) 410. This velocity will be dramatically slower than the velocity with which they were ablated onto LED(s) 410.

Desorbed atom(s) are directed to and travel through orifice 412 (e.g., an opening, such as a circular opening) of structure 402 to provide a flux of atoms through a hole in the ion trap 414. In some aspects, the diameter of orifice 412 is a design parameter to tune the overall flux exiting structure 402. In some aspects, orifice 412 is the same size as or smaller than the gap in ion trap 414. Photo-ionization laser 416 then ionizes the desorbed atom to produce trapped ion 418, which is then merged with ion chain 420 for quantum computing.

It should be noted that ablation laser pulse 406 does not necessarily need to be fired every time an ion is loaded. It is possible that sufficient material is deposited on the LED(s) 410 to support many loading events before ablation laser pulse 406 needs to be fired again. The amount of sufficient material may be determined based on the needs for quantum computing and the rate at which ions are trapped per firing. The rate at which material is produced per ablation laser pulse 406 depends on the properties of ablation laser pulse 406 (e.g., intensity) and the properties of source material 404 (e.g., resistance to ablation).

In a conventional setup, an ablation laser pulse is aimed at a source material, which produces a plume that is generally focused at an ion trap. This setup may include a mirror that is angled such that the ablation laser pulse hits the source material at an angle that causes the plume to intensify around the opening of the ion trap. However, the atoms in the plume travel too quickly to be efficiently trapped. In the present disclosure, the two-stage configuration that combines the enclosure and the LED(s) effectively slows down the atoms, which increases the likelihood of the atom being trapped. Because the trapping is more efficient, the source material is not wasted and the ablation laser pulse does not need to be constantly fired.

Figure 5:
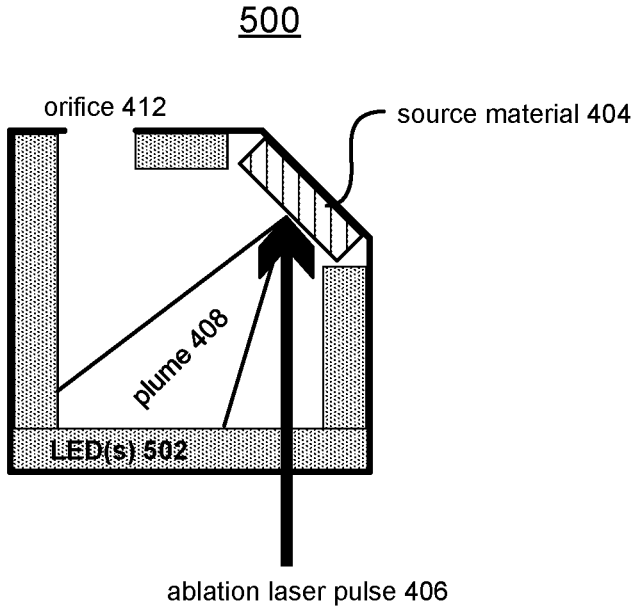
FIG. 5 illustrates an exemplary structure with LED(s) for trapping ions in accordance with aspects of this disclosure.

FIG. 5 illustrates an exemplary structure 500 with LED(s) for trapping ions in accordance with aspects of this disclosure. In one aspect, the ablated material may cover the entire inner surface of structure 402. Accordingly, structure 500 is designed with LED(s) 502 lining the entire inner structure. In some aspects, LED(s) on different sides of structure 500 may be independently controllable, allowing sectional desorption to further extend the utility of source material 404. By only turning on LEDs in one section, the high intensity light would only affect a fraction of the atoms, rather than all of them. If this fraction is sufficient to trap an ion, the remainder of the surface adsorbed atoms in other parts of the structure remain, to allow the trapping of a subsequent ion.

Figure 6A:
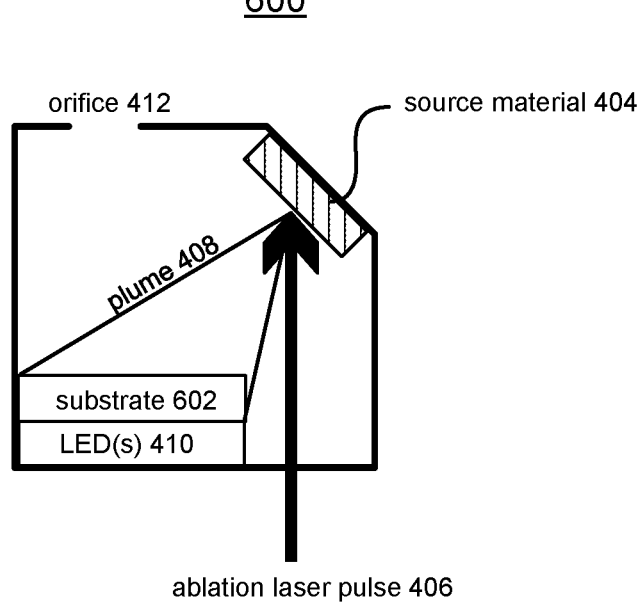
FIG. 6A illustrates an exemplary structure with a transparent substrate over LED(s) for trapping ions in accordance with aspects of this disclosure.

FIG. 6A illustrates an exemplary structure 600 with a transparent substrate over LED(s) for trapping ions in accordance with aspects of this disclosure. In FIG. 6A, a transparent substrate 602 is added onto LED(s) 410 such that atoms from ablated source material 404 are deposited on transparent substrate 602. In the event that LIAD of the target atom is more effective on a different (transparent) substrate than the surface material of the LEDs 410, the LEDs 410 can provide back illumination through the transparent substrate to accomplish LIAD. For example, if fused silica glass is more effective than the surface material of the LEDs 410, this method could be used.

Figure 6B:
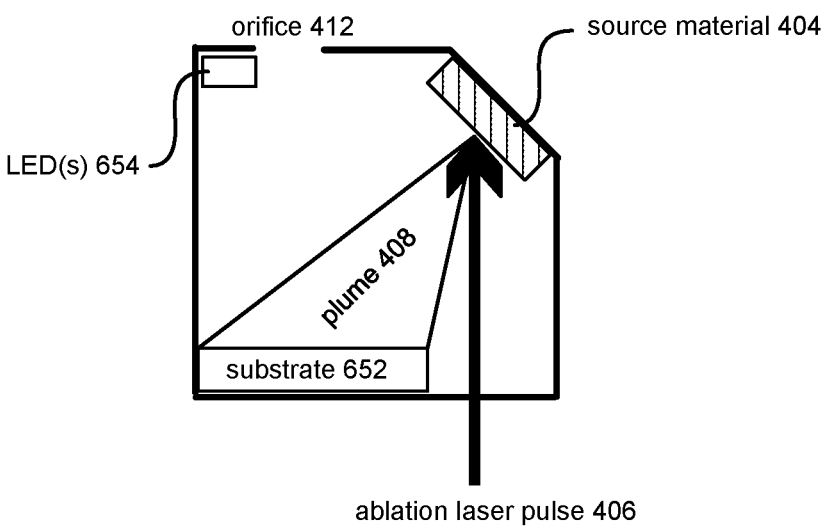
FIG. 6B illustrates an exemplary structure with a substrate opposite LED(s) for trapping ions in accordance with aspects of this disclosure.

FIG. 6B illustrates an exemplary structure 650 with a substrate opposite LED(s) for trapping ions in accordance with aspects of this disclosure. In FIG. 6B, structure 650 features a substrate 652 that is placed in place of LED(s) 410 in FIG. 6A. LED(s) 654 are shifted to the opposite side of substrate 652. This allows for front illumination of a substrate that is not transparent. Moreover, depending on the nature of the source material 404, repeated ablation may over time render the substrate 652 opaque. In this case, front illumination with LEDs 654 would be preferable to back illumination as in FIG. 6A and FIG. 4, despite the higher intensity light provided in the back illumination case.

Figure 7:
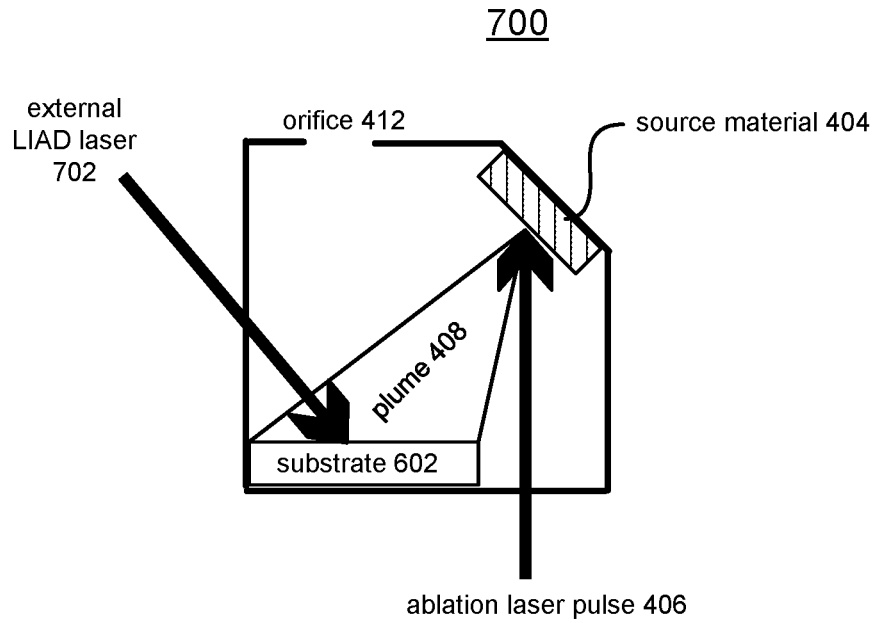
FIG. 7 illustrates an exemplary structure with an external light source for trapping ions in accordance with aspects of this disclosure.

FIG. 7 illustrates an exemplary structure 700 with an external light source for trapping ions in accordance with aspects of this disclosure. In some cases, the conditions within structure 402 (e.g., low temperature) may prevent proper operation of LED(s) 654. Thus, integrating LED(s) 654 directly into a structure may not be desired. In FIG. 7, an external light source such as a laser 702 is directed towards substrate 602 in place of LED(s) 654 to achieve the desired effect.

Figure 8:
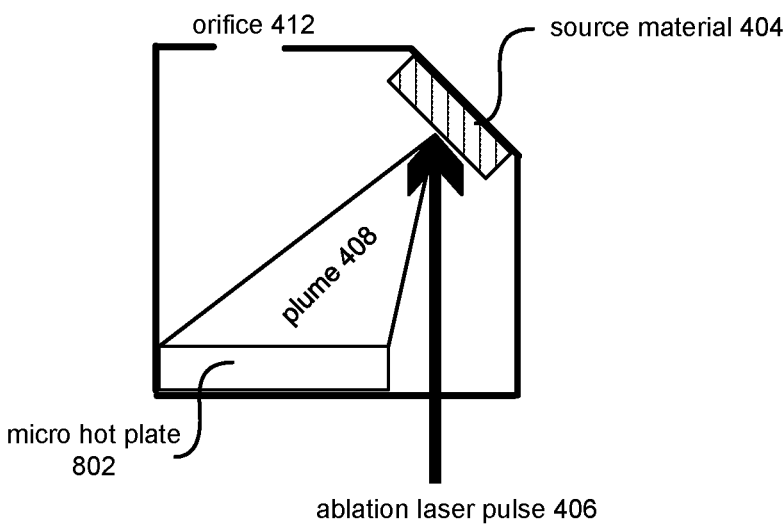
FIG. 8 illustrates an exemplary structure with a micro hot plate for trapping ions in accordance with aspects of this disclosure.

FIG. 8 illustrates an exemplary structure 800 with a micro hot plate for trapping ions in accordance with aspects of this disclosure. Structure 800 replaces LED(s) 410 in structure 402 with micro hot plate 802. Accordingly, ablation is used to deposit atoms on micro hot plate 802, which can then be heated to thermally desorb the deposited atoms through orifice 412. In some aspects, as with LIAD in FIG. 5, multiple micro hot plates may be used along the inner surface of structure 800, each of which can be independently heated.

Figure 9:
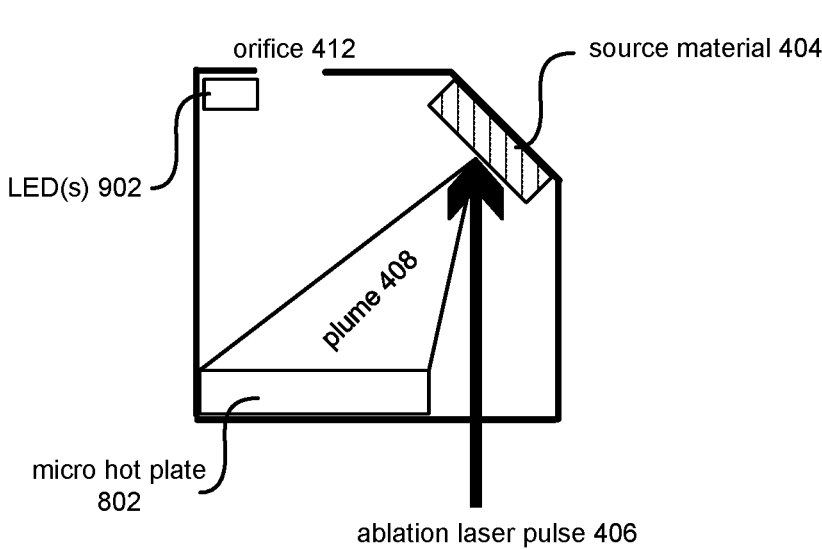
FIG. 9 illustrates an exemplary structure with a micro hot plate and LED(s) for trapping ions in accordance with aspects of this disclosure.

FIG. 9 illustrates an exemplary structure 900 with a micro hot plate and LED(s) for trapping ions in accordance with aspects of this disclosure. Structure 900 includes micro hot plate 802 for thermal desorption and LED(s) 902 for LIAD. Although structure 900 is shown in such that micro hot plate 802 is positioned in an area that intersects with the normal vector of source material 404 and LED(s) 902 are positioned opposite to micro hot plate 802, the two components can be moved or oriented in any configuration within structure 900. For example, either micro hot plate 802 or LED(s) 902 may line the remaining inner surface of structure 900 other than source material 404. Similarly, substrates described in FIGS. 6A and 6B can be added into structure 900 and/or laser 702 in place of LED(s) 902. Structure 900 addresses the characteristic that the LIAD process may be more or less effective at different temperatures. By combining LIAD with thermal release, the characteristic is addressed because the LIAD release may be more effective at slightly elevated temperatures.

The use of a two-step process which uses ablation to dissociate molecular compounds and deposit elemental material, followed by exposure to UV/blue light from LED(s) or a laser and/or heating with micro hot plates, improves the efficiency of the trapping of ions compared to conventional setups described previously. This method results in a much slower atomic plume from which to trap ions compared to conventional direct ablation. It combines the ability of ablation to dissociate molecular compounds with the ability of LIAD and/or thermal methods to release atoms with a low velocity distribution. As a result, the systems and methods of the present disclosure reduce the resources (e.g., amount of source material, intensity and frequency of an ablation laser pulse, etc.) required for quantum computing.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A quantum information processing (QIP) system comprising:
    an ablation laser beam source configured to generate an ablation laser pulse;
    an ion trapping structure including:
        an enclosure with an orifice,
        a source material that is arranged in the enclosure and receives the ablation laser pulse to provide a plume of atoms;
        at least one LED that is arranged in the enclosure and onto which at least a portion of the plume of atoms is deposited, wherein the at least one LED is configured to emit light that desorbs at least one deposited atom through the orifice of the enclosure; and
        an ion trap with a gap through which the at least one deposited atom desorbed travels from the orifice; and
    a laser beam source configured to generate a laser beam towards the at least one deposited atom creating a trapped ion.

2. The QIP system of claim 1, wherein the at least one LED is arranged opposite to the orifice.

3. The QIP system of claim 1, wherein a size of the orifice is at most a size of the gap in the ion trap.

4. The QIP system of claim 1, wherein the at least one deposited atom is desorbed with a thermal velocity distribution that is a function of a surface temperature of the at least one LED.

5. The QIP system of claim 1, wherein the at least one LED lines all sides within the enclosure with an exception of an area where the source material is arranged.

6. The QIP system of claim 5, wherein the at least one LED includes multiple LEDs and each LED is independently controllable to enable sectional desorption.

7. The QIP system of claim 1, further comprising a transparent substrate arranged on top of the at least one LED such that the portion of the plume of atoms is deposited on the transparent substrate in place of the at least one LED.

8. The QIP system of claim 1, further comprising an opaque substrate that directly receives the portion of the plume of atoms, wherein the at least one LED is arranged opposite to the opaque substrate.

9. The QIP system of claim 8, wherein the at least one LED is arranged on a side with the orifice of the enclosure.

10. A quantum information processing (QIP) system comprising:
    an ablation laser beam source configured to generate an ablation laser pulse;
    an external light source configured to generate a first laser beam;
    an ion trapping structure including:
        an enclosure with an orifice,
        a source material that is arranged in the enclosure and receives the ablation laser pulse to provide a plume of atoms;
        an opaque substrate that is arranged in the enclosure and receives both the first laser beam and at least a portion of the plume of atoms, causing desorption of at least one atom through the orifice of the enclosure; and
        an ion trap with a gap through which the at least one atom travels from the orifice; and
    a laser beam source configured to generate a second laser beam towards the at least one atom creating a trapped ion.

11. The QIP system of claim 10, wherein the first laser beam is a light induced atomic desorption (LIAD) laser beam.

12. A quantum information processing (QIP) system comprising:
    an ablation laser beam source configured to generate an ablation laser pulse;
    an ion trapping structure including:
        an enclosure with an orifice,
        a source material that is arranged in the enclosure and receives the ablation laser pulse causing a creation of a plume of atoms;
        a hot plate that is arranged in the enclosure onto which at least a portion of the plume of atoms is deposited, wherein the hot plate increases in temperature causing thermal desorption of at least one atom through the orifice; and
        an ion trap with a gap through which the at least one atom travels from the orifice; and
    a laser beam source configured to generate a laser beam towards the at least one atom creating a trapped ion.

13. The QIP system of claim 12, wherein a size of the orifice is at most a size of the gap in the ion trap.

14. The QIP system of claim 12, wherein the ion trapping structure further includes at least one other hot plate arranged in the enclosure onto which at least another portion of the plume of atoms is deposited.

15. A quantum information processing (QIP) system comprising:

an ablation laser beam source configured to generate an ablation laser pulse;

an ion trapping structure including:

an enclosure with an orifice, a source material that is arranged in the enclosure and receives the ablation laser pulse to provide a plume of atoms;

a hot plate that is arranged in the enclosure and receives at least a portion of the plume of atoms, wherein the hot plate increases in temperature causing thermal desorption of at least one atom;

at least one LED that is arranged in the enclosure and onto which the at least one atom is deposited, wherein the at least one LED is configured to emit light that desorbs the at least one atom through the orifice of the enclosure; and an ion trap with a gap through which the at least one atom travels from the orifice; and a laser beam source configured to generate a laser beam towards the at least one atom creating a trapped ion.

16. The QIP system of claim 15, wherein the ion trapping structure further includes at least one other hot plate arranged in the enclosure onto which at least another portion of the plume of atoms is deposited.

17. The QIP system of claim 15, wherein the at least one LED is arranged opposite to the hot plate.

18. The QIP system of claim 15, wherein the at least one deposited atom is desorbed with a thermal velocity distribution that is a function of a surface temperature of the at least one LED.

19. The QIP system of claim 15, wherein the at least one LED includes multiple LEDs and each LED is independently controllable to enable sectional desorption.

20. The QIP system of claim 15, wherein the at least one LED lines all sides within the enclosure with an exception of areas where the source material and the hot plate are arranged.

* * * * *